US009747462B2

(12) United States Patent
Hanner, Sr. et al.

(10) Patent No.: US 9,747,462 B2
(45) Date of Patent: *Aug. 29, 2017

(54) STEGANOGRAPHY DETECTION

(71) Applicant: Bank of America Corporation, Charlotte, NC (US)

(72) Inventors: Richard D. Hanner, Sr., McKinney, TX (US); Gwendolynne Chaperon-Dewolf, Brighton, MI (US); Chris Stott, Charlotte, NC (US); Joseph Werner, Brick, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,735

(22) Filed: Feb. 1, 2017

(65) Prior Publication Data

US 2017/0140163 A1    May 18, 2017

Related U.S. Application Data

(63) Continuation of application No. 14/887,606, filed on Oct. 20, 2015, now Pat. No. 9,589,147, which is a continuation of application No. 13/943,481, filed on Jul. 16, 2013, now Pat. No. 9,197,655.

(51) Int. Cl.
*G06F 21/62* (2013.01)
*H04L 29/06* (2006.01)
*G06F 17/30* (2006.01)

(52) U.S. Cl.
CPC .... *G06F 21/6209* (2013.01); *G06F 17/30106* (2013.01); *H04L 63/123* (2013.01)

(58) Field of Classification Search
None
See application file for complete search history.

(56) References Cited

U.S. PATENT DOCUMENTS

| | | |
|---|---|---|
| 6,307,949 B1 | 10/2001 | Rhoads |
| 7,007,166 B1 | 2/2006 | Moskowitz et al. |
| 8,813,236 B1 * | 8/2014 | Saha ................... H04L 63/1408 726/22 |
| 9,197,655 B2 * | 11/2015 | Hanner, Sr. ......... H04L 63/0245 |

(Continued)

*Primary Examiner* — Kaveh Abrishamkar
(74) *Attorney, Agent, or Firm* — Banner & Witcoff, Ltd.; Michael A. Springs

(57) ABSTRACT

Systems and methods for detecting potential steganography use to hide content in computer files transmitted via electronic communications are provided. An electronic communication associated with a computer file may be identified. The communication and the computer file may be analyzed to determine whether the computer file potentially includes hidden content. To determine whether the computer file potentially includes hidden content, a set of steganographic criteria may be analyzed. If at least a portion of the steganographic criteria are satisfied, then it may be determined that the computer file potentially includes hidden content. If at least a portion of the steganographic criteria are not satisfied, then it may be determined that the computer file does not potentially include hidden content. If the computer file is determined to potentially include hidden content, an individual may be notified of the communication associated with the computer file.

20 Claims, 9 Drawing Sheets

(56) References Cited

U.S. PATENT DOCUMENTS

| | | |
|---|---|---|
| 9,589,147 B2 * | 3/2017 | Hanner, Sr. ......... H04L 63/0245 |
| 2002/0033844 A1 | 3/2002 | Levy et al. |
| 2002/0059384 A1 | 5/2002 | Kaars |
| 2005/0283837 A1 * | 12/2005 | Olivier .................. H04L 63/145 |
| | | 726/24 |
| 2006/0047769 A1 * | 3/2006 | Davis ................... G06Q 10/107 |
| | | 709/207 |
| 2006/0222203 A1 | 10/2006 | Mercier |
| 2010/0064368 A1 * | 3/2010 | Stolfo ................... G06F 21/564 |
| | | 726/24 |
| 2012/0063635 A1 | 3/2012 | Matsushita et al. |
| 2013/0290658 A1 | 10/2013 | Li et al. |
| 2014/0007246 A1 | 1/2014 | Nelson et al. |
| 2014/0294229 A1 | 10/2014 | Le Guelvouit et al. |
| 2016/0205071 A1 * | 7/2016 | Cooper ............... H04L 12/6418 |
| | | 726/1 |

* cited by examiner

STEGANOGRAPHY DETECTION

CROSS-REFERENCE TO RELATED-APPLICATION

This application is a continuation of U.S. patent application Ser. No. 14/887,606 entitled "Steganography Detection" and filed on Oct. 20, 2015, which is a continuation of U.S. patent application Ser. No. 13/943,481 entitled "Steganography Detection" and filed on Jul. 16, 2013, which issued as U.S. Pat. No. 9,197,655 on Nov. 24, 2015, each of which is incorporated by reference in its entirety herein.

TECHNICAL FIELD

The present disclosure generally relates to steganography and relates in particular to the detection of steganography through an analysis of a computer file associated with an electronic communication.

BACKGROUND

Steganography is the practice of hiding messages or other content such that the existence of the hidden message or content is unknown to anyone except the sender and the recipient. Steganography differs from cryptography in that the existence of an encrypted message may be known others beyond the sender and recipient. While cryptography provides security though obfuscation, steganography may provide security through concealment. As encrypted messages are vulnerable to cryptanalysis techniques to decode an encrypted message, cryptography may be combined with steganography such that the existence of the encrypted message itself goes undetected. Steganographic techniques may include hiding messages in computer-based image files, audio files, video files, and other types of computer files.

While steganography may be advantageously employed to exchange secure communications, it may also be employed to surreptitiously transmit sensitive or confidential information. Organizations that deal in sensitive or confidential information are dedicated to maintaining the privacy of such information. Therefore, these organizations may be interested in steganalysis techniques to detect the use of steganography.

Steganalysis refers to the detection of steganography used to hide messages or other content. Although research has been conducted into developing steganalysis techniques there remains room for improvement. In particular, organizations such as business and other enterprises may generate thousands—if not millions—of communications daily. Monitoring all of these communications for potential hidden messages or hidden content can be a challenge. Therefore, a need exists for improved approaches to detecting the use of steganography.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the present disclosure provide approaches to detecting the potential use of steganography to hide content in computer files transmitted via electronic communications.

According to various aspects, a computer-implemented method of detecting potential steganography use is provided. An electronic communication associated with a computer file may be identified. The communication and the computer file may be analyzed to determine whether the computer file potentially includes hidden content. To determine whether the computer file potentially includes hidden content, a set of steganographic criteria may be analyzed. If at least a portion of the steganographic criteria are satisfied, then it may be determined that the computer file potentially includes hidden content. If at least a portion of the steganographic criteria are not satisfied, then it may be determined that the computer file does not potentially include hidden content. If the computer file is determined to potentially include hidden content, an individual may be notified of the communication associated with the computer file.

The computer file may be compared to another computer file to determine whether the steganographic criteria are satisfied. The file characteristics of the computer file may be compared to corresponding file characteristics of the other computer file. File characteristics may include various file properties, file size, and a checksum. In some example embodiments, the computer file may be an image file, and the file characteristics may include an image resolution. The other computer file may be located at a computing device from which the computer file was sent or located from a file search service as a file search result in a file search result set. The other computer file may be a file downloaded via an email client or a web browser of the computing device and may be selected based on its filename.

The communication may be analyzed when the communication is part of a communication trend. To determine whether the communication is part of a communication trend, a set of trending criteria may be analyzed. If at least a portion of the trending criteria are satisfied, then it may be determined that the communication is part of a communication trend. If at least a portion of the trending criteria are not satisfied, then it may be determined that the communication is not part of a communication trend. Trending criteria may refer to the number, timeframe, time period, and recipients of previous communications sent prior to the communication. Whether or not a computing device includes steganography applications may also be determined.

A steganalysis system having a processor, data store, communication analyzer, file analyzer, and computing device analyzer is also provided to detect the potential use of steganography as described above. Non-transitory computer-readable media having computer-executable instructions that, when executed by a processor of a steganalysis system, cause the steganalysis system to perform steps for detecting potential use of steganography are also provided. These and other aspects will be appreciated with the benefit of the detailed description provided below.

DETAILED DESCRIPTION

Figure 1:
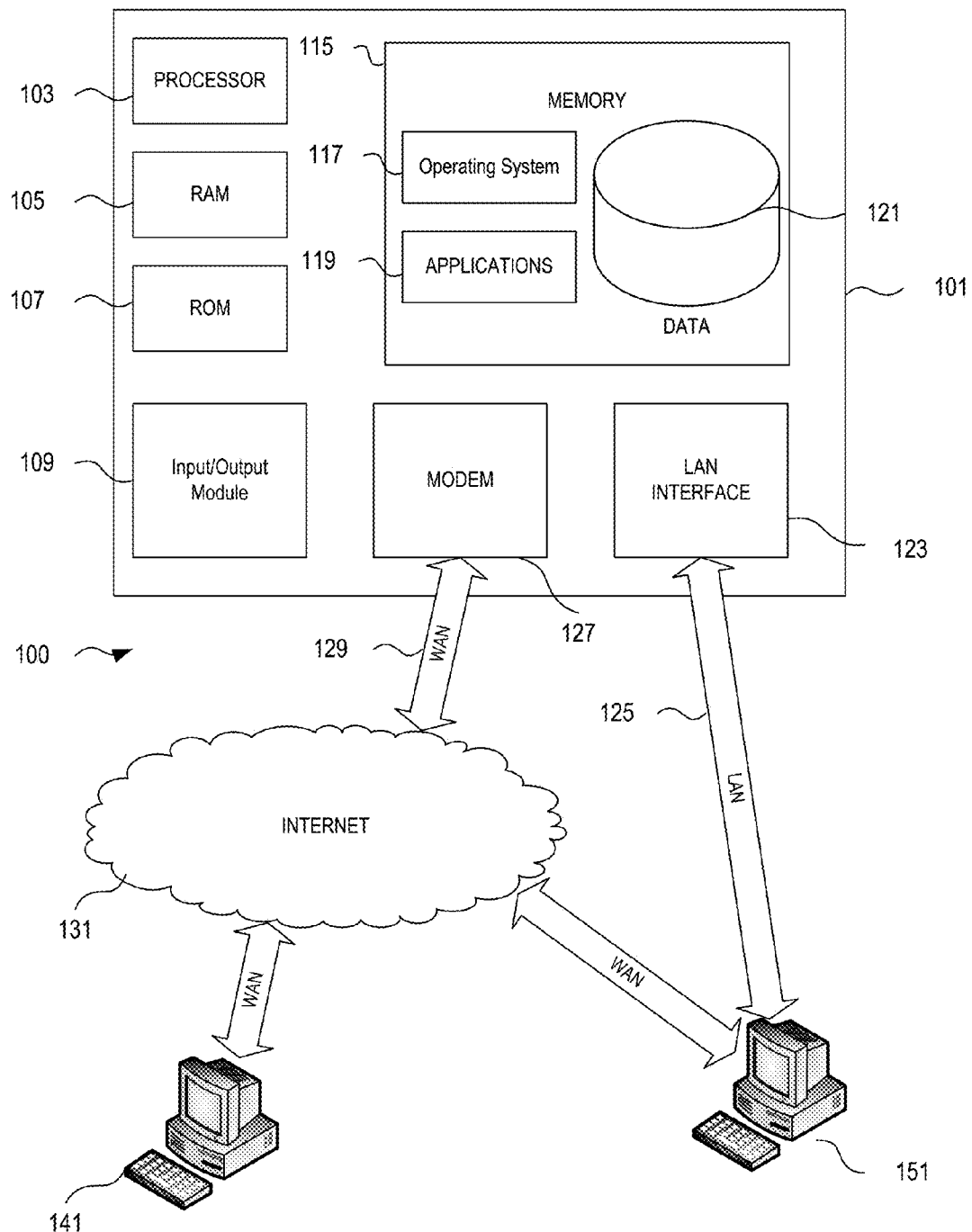
FIG. 1 is a block diagram of an example operating environment in which various aspects of the disclosure may be implemented.

Aspects of the present disclosure are directed towards investigating the use of steganography. In particular, aspects of the present disclosure are directed towards detecting the potential use of steganography to hide content in computer files included in electronic communications. Stated differently, the present disclosure describes example approaches for identifying electronic communications associated with computer files that potentially contain content hidden using steganographic techniques. Steganography may be detected through an analysis of the communication. The analysis of the communication may include an analysis of the sender of the communication, the computing device at which the communication originated, the computer file associated with the communication, and other communications that may share a common characteristic with the communication in question. When a computer file is determined to potentially include content hidden through steganography, the electronic communication associated with that file may be flagged for further investigation. Electronic communications may be employed to transmit computer files between locations. In this regard, an electronic communication may be described as including or having a computer file or may be described as being associated with a computer file being transmitted.

It will be appreciated that the steganalysis techniques described below may not identify every instance of the use of steganography and may flag some communications that do not involve the use of steganography. The steganalysis techniques described below, however, may advantageously identify electronic communications that potentially involve the use of steganography thereby allowing for further investigation of the communication or the individual that sent the communication. More particularly, the steganalysis techniques described below may identify electronic communications that satisfy various steganographic criteria in which the use of steganography is more likely when a criterion is satisfied relative to when the criterion is not satisfied. In this way, the steganalysis techniques advantageously allow an organization to take remedial action upon detection of the potential use of steganography. Remedial measures may include, for example, notifying an analyst or investigator, applying additional steganographic techniques to verify that content is in fact hidden in the computer file, identifying the hidden content to determine whether it includes confidential or sensitive information, decrypting the hidden content if it is encrypted, initiating disciplinary procedures against the sender of the communication, and other remedial procedures. Through these remedial measures, an organization may thus preserve the privacy, security, and integrity of sensitive or confidential information.

In some example implementations, the principles described below may be employed to monitor and analyze every electronic communication occurring at an organization. Monitoring and analyzing every communication, however, may involve significant amounts of computing resources. As a result, other example implementations may analyze some but not all of the communications occurring at an organization. In these other example implementations, a steganalysis system may employ various steganographic criteria to identify communications that potentially involve the use of steganography. The steganographic criteria employed may positively correlate with the potential use of steganography such that, if a criterion is satisfied, there is a greater likelihood of the use of steganography than if the criterion is not satisfied. As described in further detail below, the steganographic criteria may relate to various characteristics of the communication, of a computer file associated with the communication, of sender that sent the communication, and of the computing device at which the communication originated.

The approaches described below may be employed to detect potential steganography in electronic communications through a series of escalating analyses. In general, a steganalysis system may monitor communication traffic occurring at a computer system, identify any anomalous communications, and compare the anomalous communications to steganographic criteria to assess the likelihood that the communication involves the use of steganography. If the system determines a communication does potentially involve the use of steganography, the system may identify the communication to an analyst or investigator at a forensics department of the organization for further review. These and other aspects will be described in further detail below.

1. Illustrative Computer Architecture

FIG. 1 illustrates a block diagram of steganalysis system 101 (e.g., a computer server) in communication system 100 that may be used according to an illustrative embodiment of the disclosure. The system 101 may have a processor 103 for controlling overall operation of the system and its associated components, including RAM 105, ROM 107, input/output (I/O) module 109, and memory 115.

I/O 109 may include a microphone, keypad, touch screen, and/or stylus through which a user of the steganalysis system 101 may provide input, and may also include one or more of a speaker for providing audio output and a video display device for providing textual, audiovisual and/or graphical output. Software may be stored within memory 115 and/or storage to provide instructions to processor 103 for enabling the system 101 to perform various functions. For example, memory 115 may store software used by the system 101, such as an operating system 117, application programs 119, and an associated database 121. Processor 103 and its associated components may allow the system 101 to run a series of computer-readable instructions to detect steganography.

The system 101 may operate in a networked environment supporting connections to one or more remote computers, such as terminals 141 and 151. The terminals 141 and 151 may be personal computers or servers that include many or all of the elements described above relative to the system 101. Alternatively, terminal 141 and/or 151 may be a data store that is affected by the backup and retention policies stored on the system 101. The network connections depicted in FIG. 1 include a local area network (LAN) 125 and a wide area network (WAN) 129, but may also include other networks. When used in a LAN networking environment, the system 101 is connected to the LAN 125 through a network interface or adapter 123. When used in a WAN networking environment, the system 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, one or more application programs 119 used by the steganalysis system 101 according to an illustrative embodiment of the disclosure may include computer executable instructions for invoking functionality related to detecting steganography.

The steganalysis system 101 and/or terminals 141 or 151 may also be mobile terminals, such as smart phones, personal digital assistants (PDAs), etc. including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote non-transitory computer-readable storage media including memory storage devices. As used in this disclosure, a non-transitory computer-readable storage medium refers to all computer-readable media with the sole exception being a transitory, propagating signal.

Figure 2:
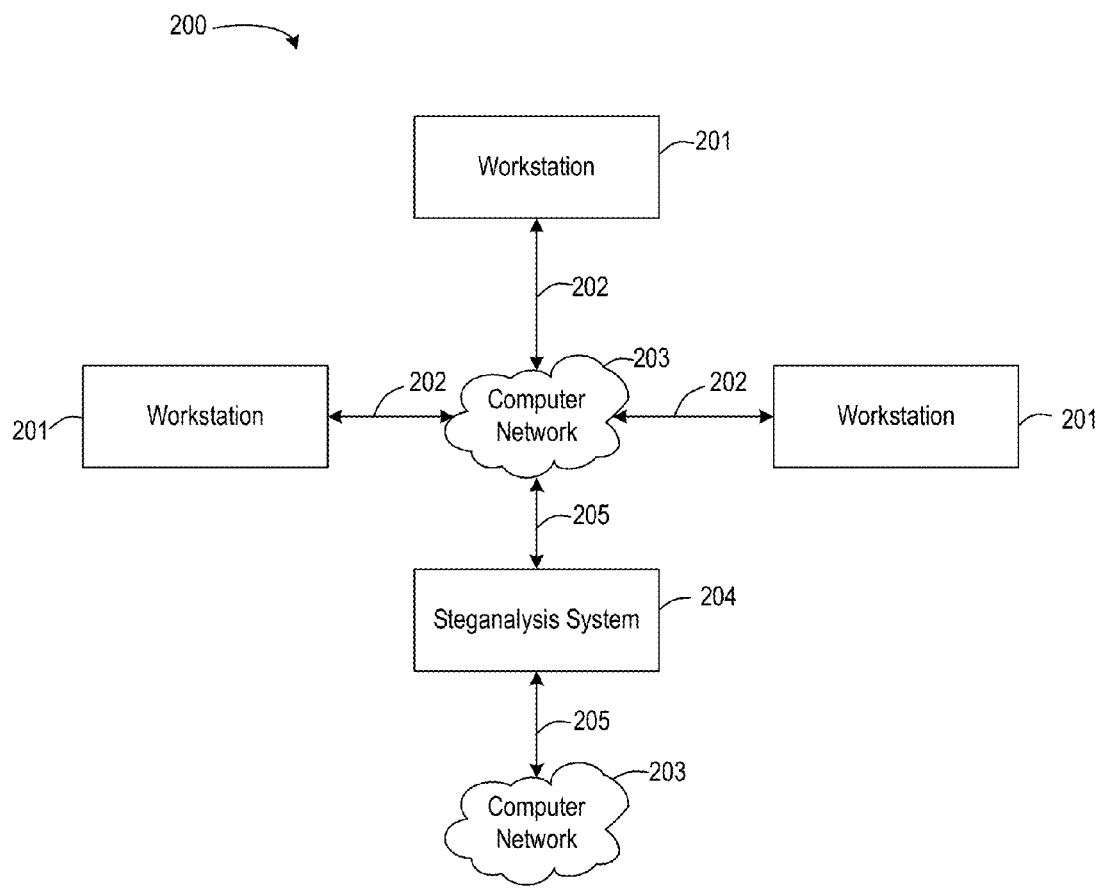
FIG. 2 is a block diagram of example workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations 201. Workstations 201 may be various types of computing devices, e.g., desktop computers, laptop computers, servers, and so forth and may be local or remote, and are connected by one or more communications links 202 to computer network 203 that is linked via communications links 205 to the steganalysis system 204. In certain embodiments, workstations 201 may be utilized by users of an organization to create and send messages, receive messages, and perform other computing-related activities. In system 200, the steganalysis system 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the steganalysis system 204, such as network links, dial-up links, wireless links, hard-wired links, etc.

The disclosure that follows in the figures may be implemented by one or more of the components in FIG. 1 and FIG. 2 and/or other components, including other computing devices.

2. Illustrative Steganalysis System and Steganalysis Techniques

As noted above, systems and methods for performing steganalysis to detect the potential use of steganography are provided. The disclosures set forth below describe various approaches to detecting the potential use of steganography in computer files associated with electronic communications. The example approaches will first be described as general steps for detecting the use of steganography. Some of these steps will then be described in further detail to note and describe various sub-steps. It will be appreciated that the steps for detecting the potential use of steganography set forth below are described by way of example only. Accordingly, one or more of the steps may be optionally performed, various combinations of steps may be selectively performed, and the steps may be performed in an order other than the example order set forth in the accompanying figures.

Figure 3:
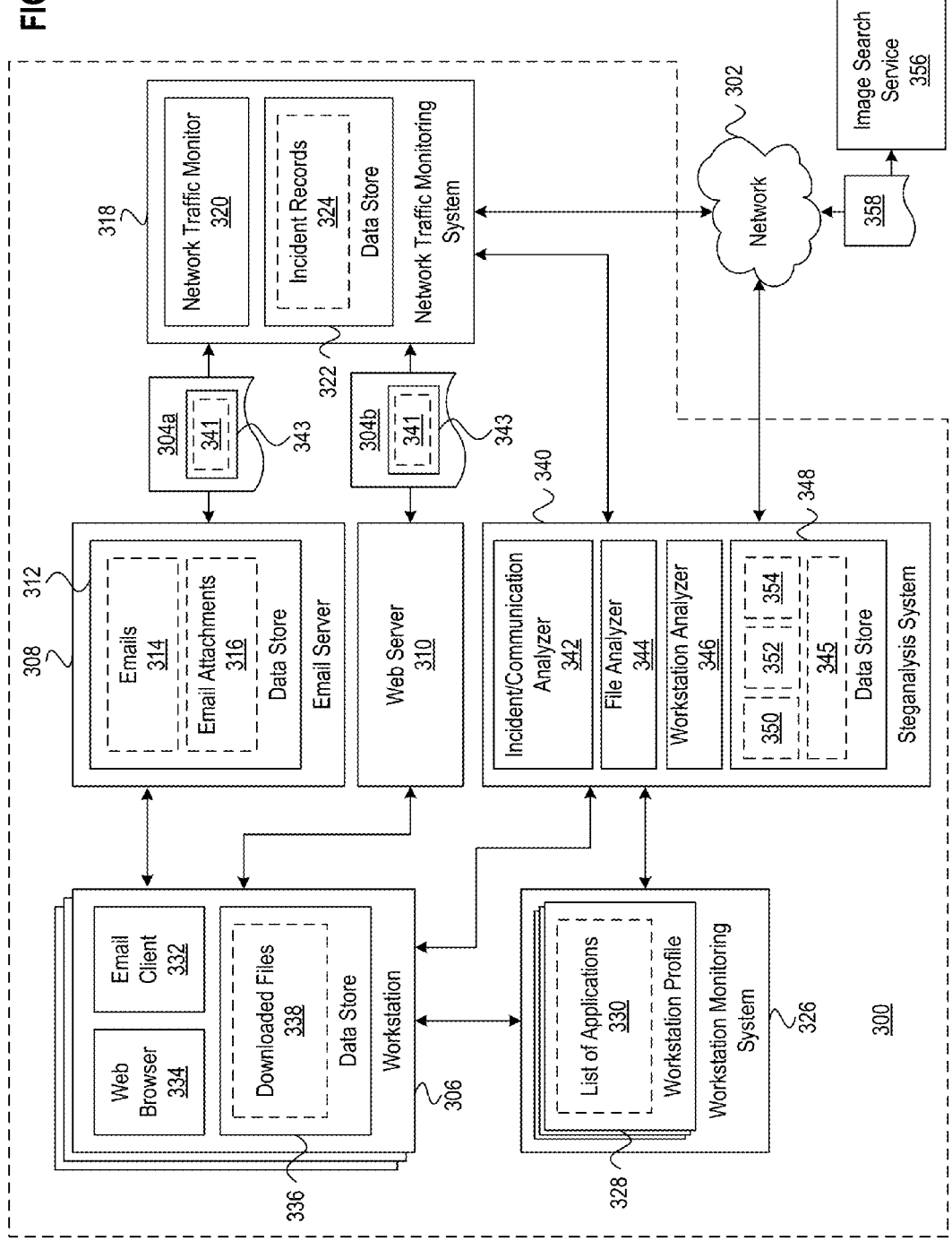
FIG. 3 illustrates an example computer system that includes an example of an implementation of a steganalysis system.

Referring now to FIG. 3, an example of an implementation of a computer system 300 of an organization is shown. The system 300 may exchange communications with various internal resources as well as various external resources via a wide area network 302 such as e.g., the Internet. The system 300 may monitor electronic communications 304a and 304b (collectively 304) received at and transmitted from various workstations 306 of the system. The communications 304 may include, e.g., email communications 304a and web communications 304b. Accordingly, the system 300 may include an email server 308 that transmits and receives email communications 304a as well as a web server 310 that transmits and receives web communications 304b are transmitted and received. The email server 308 may include a data store 312 that stores emails 314 and any email attachments 316 associated with the emails. Email attachments 316 may include computer files such as, e.g., image files, audio files, video files, archive files, document files, presentation files, spreadsheet files, and so forth. Additional types of network communications and computer files will be appreciated.

The system 300 may include a network traffic monitoring system 318 to monitor and analyze ingoing and outgoing network traffic. Accordingly, the network traffic monitoring system 318 may be a proxy server or gateway through which the ingoing and outgoing communications 304 pass when respectively received at and transmitted from the system 300. In this regard, the network traffic monitoring system 318 may be a data loss prevention and security solution that protects confidential and sensitive data of an organization.

The network traffic monitoring system 318 may include a network traffic monitor 320 that analyzes the network traffic of the system 300. The network traffic monitor 320 may employ a customizable network traffic ruleset (not shown) when analyzing the communications 304. If the communication satisfies one or more rules of the network traffic ruleset, the network traffic monitor 320 may generate a network incident associated with the communication. As an example, the network traffic ruleset may be selectively configured such that the network traffic monitor 320 generates an incident when an outgoing email attachment or uploaded file exceeds a predetermined file size, e.g., five megabytes (MB). The network traffic monitoring system 318 may thus include a data store 322 to store records 324 of the network incidents. The incident records 324 may include information about the communication 304, e.g., the rule that triggered the communication, the sender of the communication, the recipient of the communication, and other information related to the communication. Suitable network traffic monitoring systems 318 that include at least some of the features described above are commercially available.

An enterprise may also employ a workstation monitoring system 326 to monitor the computing activities occurring at the workstations 306. The workstation monitoring system 326 may store a respective workstation profile 328 for each workstation 306 of the system 300. The workstation profile 328 may include, e.g., a list of applications 330 installed at a corresponding workstation 306. Suitable workstation monitoring systems that include at least some of these features may also be commercially available.

As noted above, a workstation 306 may include various applications such as e.g., an email client 332 and a web browser 334 for sending and receiving email communications 304*a* and web communications 304*b* respectively. The workstation 306 may also include a data store 336 that stores, among others, files 338 downloaded via the email client 332 or the web browser 334. The downloaded files 338 may include, for example, email attachments downloaded from an email, temporary web files automatically downloaded through the course of regular web browsing, and files actively retrieved from a remote network resource, e.g., via a URL over the Internet. A web browsing history may identify any files 338 downloaded via the web browser 334 and an email history may identify any files 338 downloaded via the email client 332.

The system 300, in this example, additionally includes a steganalysis system 340 to detect the use of potential steganography to hide content 341 in computer files 343 ("files") respectively associated with the communications 304. The hidden content 341 may be, e.g., text-based messages, archived files, images, and the like. As an example, steganographic techniques may be employed to hide one image within another image. As another example, steganographic techniques may be employed to hide an archive file (e.g., a ZIP) file within an image file such that image is displayed when the user opens the image file in an image viewer, and the contents of the archive file are displayed when the user opens the image file at an archive viewer. These and other steganographic techniques will be appreciated.

As described in further detail below, the steganalysis system 340 may detect potential steganography based, at least in part, on computer files 343 associated with electronic communications, e.g., email attachments 316 associated with email communications 304*a* or file uploads associated with web communications 304*b*. As also described further below, the steganalysis system may also detect potential steganography based in part on various characteristics associated with the electronic communications, e.g., communication patterns associated with the sender of the communication. Accordingly, the steganalysis system may be in signal communication with the network traffic monitoring system 318, the workstation monitoring system 326, and the workstations 306 themselves. The steganalysis system 340, in this example, includes an incident analyzer 342, a file analyzer 344, and a workstation analyzer 346. The steganalysis system 340 may collectively utilize these components to detect the potential use of steganography in the communications 304. The incident analyzer 342 may analyze the incident records 324 of the network traffic monitoring system 318 as well as the communications 304 respectively associated with the incidents. In this regard, the incident analyzer 342 may also be referred to as a communication analyzer. The file analyzer 344 may analyze the files 343 respectively associated with the communications 304, e.g., email attachments 316 and downloaded files 338. The workstation analyzer 346 may analyze the workstations 306 and their corresponding workstation profiles 328 and activities via the workstation monitoring system 326. Because the workstation 306 refers to a computing device, the workstation analyzer 346 may also be referred to as a computing device analyzer. As discussed in further detail below, the file analyzer 344 may compare a file 343 to a target file 345 in order to determine whether the file includes content 341 hidden using steganography. The target file 345 may be stored in the data store 348 of the steganalysis system 340 for use during the steganography detection process. The steganalysis system 340 may retrieve a target file 345 from, e.g., a workstation 306 of the computer system 300 or a resource external to the computer system and accessible via the network 302.

The workstation analyzer 346 may analyze the workstations 306 of the system 300 as well as the respective workstation profiles 328 of the workstations. In some example implementations, the steganalysis system 340 may include a data store 348 that stores a list of known steganography applications 350. As described further below, installation of a steganalysis tool at a workstation 306 may positively correlate with the potential use of steganography. Accordingly, the steganalysis system 340 may compare the list of known steganography applications 350 to the list of applications 330 installed at the workstation 306. As also described in further detail below, steganographic criteria may include trending criteria 352 and communication criteria 354, which may be stored at the data store 348 of the steganalysis system 340. The trending criteria 352 and the communication criteria 354 may be implemented as, for example, a ruleset similar to the network traffic ruleset discussed above.

The steganalysis system 340 may also be in signal communication via the network 302 with a file search service such as, e.g., an image search service 356 as shown by way of example in FIG. 3. Suitable image search services may be freely available over the Internet. The steganalysis system 340 may thus submit an image search query to the image search service 356. The image search service 356 may be configured to locate images based on, e.g., a filename, image metadata, or the actual content of the image through image recognition techniques. Accordingly, the steganalysis system 340 may submit an image search query that includes a filename, one or more image metadata values, an image file, or combinations of such. The image search service 356 may return a set of image search results. The image search results may contain one or more images that the image search service 356 identifies as matching the image in the search query. The steganalysis system 340 may then select one or more of the image search results to use when analyzing an image to detect potential steganography. The steganalysis system 340 may be configured to automatically select one or more of the image search results or, additionally or alternatively, may receive one or more of the image search results in response to manual selection by a user. It will be appreciated that the file search service may be configured to search for and locate other types of computer files such as audio files, video files, and the like. Accordingly, the file search service may additionally or alternatively be an audio search service, a video search service, a general computer file search service, and combinations of such.

Figure 4:
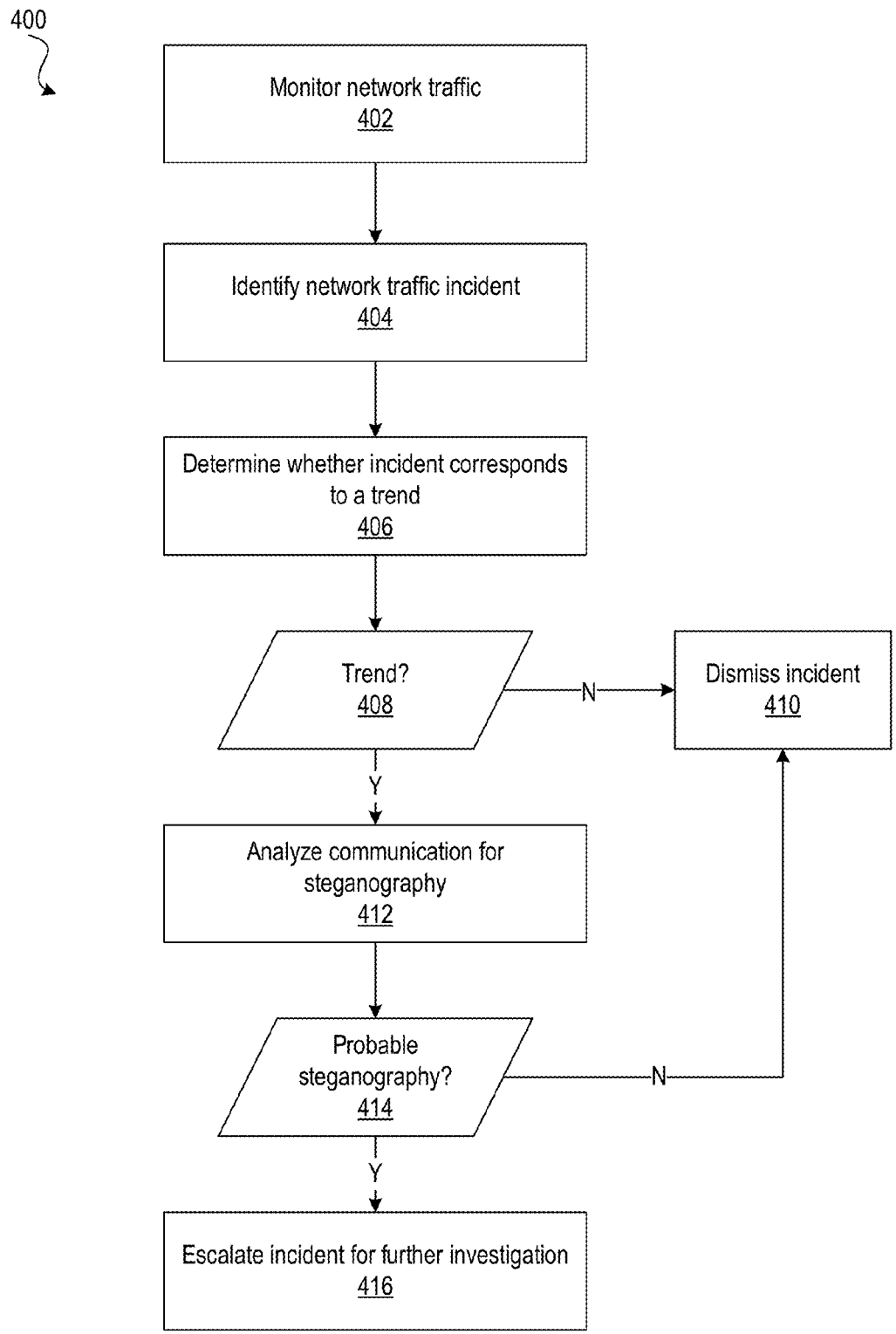
FIG. 4 is a flowchart of example method steps for detecting the potential use of steganography to hide content in an electronic communication.

FIG. 4 is a flowchart 400 of example method steps for detecting the potential use of steganography to hide content 341 in an electronic communication 304. The example method steps shown in FIG. 4 provide a general overview of the process of detecting potential steganography. As noted above, steganographic techniques may hide content 341 in various types of computer files 343 such as image files, audio files, video files, and the like. By way of example only, the example steganalysis techniques set forth below are described in the context of image files that potentially contain content 341 hidden using steganography. It will be appreciated, however, that one or more of the techniques described below may be employed to detect potential steganography for other types of computer files.

In some example implementations, the process of detecting potential steganography may include three stages: a network incident detection stage, a trending analysis stage, and a communication analysis stage. During the network incident detection stage, the network traffic monitoring system 318 may monitor incoming and outgoing network traffic at a computer system (block 402). As noted above, the network traffic monitoring system 318 may employ a network traffic ruleset to generate network traffic incidents when a communication 304 satisfies one or more rules of the network traffic ruleset. For steganography detection, the network traffic ruleset may be configured to generate network traffic incidents upon detection of communications 304 associated with a computer file 343 having a file size that exceeds a predetermined file size threshold, e.g., at least 5 MB. If the network traffic monitor 320 detects a communication 304 that satisfies a rule of the ruleset (e.g., a file size rule), then the network traffic monitor may generate a network traffic incident in response (block 404). The network traffic monitor 320 may create an incident record 324 corresponding to the network traffic incident and store the incident record at the data store 322 of the network traffic monitoring system 318.

During the trending analysis stage, the steganalysis system 340 may utilize the incident analyzer 342 to analyze the incident records 324 and determine whether a detected network traffic incident and its associated communication correspond to a communication trend (block 406). As used in this disclosure, a communication trend refers to at least two communications 304 that share a common characteristic. When a network traffic incident corresponds to a communication trend, the communication 304 associated with the incident may be described as being part of the communication trend. To determine whether a network traffic incident corresponds to a communication trend, the incident analyzer 342 may utilize a set a trending criteria 352. The incident analyzer 342 may analyze the incident in question along with one or more previous network traffic incidents by comparing the network traffic incidents to the set of trending criteria 352. The incident analyzer 342 may, for example, select previous network traffic incidents associated with the sender of the incident in question. A sender may be uniquely identified by, for example, an email address, a network address (e.g., an IP address), and other types of identifiers that uniquely identify a sender. Based on the analysis of the incident in question as well as any previous network traffic incidents, the incident analyzer 342 may determine whether or not the incident in question corresponds to a communication trend.

The set of trending criteria 352 may include a criterion that, when satisfied, indicates a communication 304 is more likely to correspond to a communication trend than when the criterion is not satisfied. The incident analyzer 342 may determine the incident in question corresponds to a communication trend when the incident or the communication 304 associated with the incident satisfy one or more of the trending criteria 352. The incident analyzer 342 may be configured to determine that the incident in question corresponds to a communication trend when some but not all of the trending criteria 352 are satisfied. The incident analyzer 342 may also be configured to determine that the incident in question does not correspond to a communication trend even though some of the trending criteria 352 are satisfied. As an example, if the trending set of criteria includes five total trending criterions, the incident analyzer 342 may determine the incident in question corresponds to a communication trend when the incident or communication 304 associated with the incident satisfies three or more of the five total trending criterions. The incident analyzer 342, in this example, may also determine that the incident in question does not correspond to a communication trend when the incident or communication 304 satisfy two or less of the five total trending criteria. Additional and alternative approaches may be selectively employed to determine when an incident in question corresponds to a communication trend. As used in this disclosure, a set of criteria refers to a collection of one or more criterions.

The trending criteria 352 may relate to various characteristics of the incident in question or the communication 304 associated with the incident. As one example, the set trending criteria 352 may include a criterion directed towards the frequency of previous network traffic incidents, in particular, whether a predetermined number of incidents have occurred within a predetermined timeframe, e.g., three total incidents within the previous month. As another example, the set of trending criteria 352 may include a criterion directed towards the consistency of the recipients, in particular, whether the percentage of communications 304 sent to the same recipient exceeds a predetermined threshold, e.g., whether 50% of the communications associated with the previous incidents were sent to a common recipient, e.g., the same recipient. The set of trending criteria 352 may further include criterions directed towards other characteristics that an incident or communication 304 in question share with the previous incidents. The incident analyzer 342 may determine, for example, whether the previous incidents consistently occur at a common time period (e.g., every Friday, the last Friday of every month, and so forth). In response to determining that the previous incidents or previous communications satisfy one or more of the trending criteria 352, the incident analyzer 342 may determine that a network traffic incident in question corresponds to a communication trend. Additional or alternative trending criteria may be selectively employed to determine whether a network traffic incident in question corresponds to a communication trend.

Referring back to FIG. 4, if the incident analyzer 342 determines that the network traffic incident in question does not correspond to a communication trend (block 408:N)— i.e., that the communication 304 is not a communication beyond what would normally be expected—then the steganalysis system 340 may dismiss the incident (block 410). It will be appreciated, however, that the network traffic monitoring system 318 may maintain the incident record 324 for the incident so that the steganalysis system 340 may subsequently analyze the incident to determine if a subsequent network traffic incident corresponds to a communication trend. Stated differently, although the steganalysis system 340 may dismiss a network traffic incident, the dismissed network traffic incident may be part of a communication trend subsequently identified through an analysis of a subsequent network traffic incident.

On the other hand, if the incident analyzer 342 determines that the network traffic incident in question does correspond to a communication trend (block 408:Y), then the steganalysis system 340 may move on to the communication analysis stage. During the communication analysis stage, the steganalysis system 340 analyzes the communication 304 associated with the incident (block 412) to determine whether the communication potentially includes content 341 hidden through steganography. To determine whether the communication 304 potentially involves the use of steganography, the file analyzer 344 may utilize a set of communication criteria 354 when analyzing the communication. The file analyzer 344 may analyze the communication associated with the incident in question and compare various file characteristics to the communication criteria 354. Based on the analysis of the communication 304, the file analyzer 344 may determine whether or not to escalate the incident for further investigation due to a likelihood of steganography use. The communication criteria 354 may include a criterion that, when satisfied, indicates a communication 304 is more likely to involve the use of steganography than when the criterion is not satisfied. The file analyzer 344 may determine that the communication 304 in question potentially involves the use of steganography when the communication satisfies one or more of the communication criteria 354. The file analyzer 344 may also be configured to determine communication 304 in question potentially involves the use of steganography when the communication satisfies some but not all of the communication criteria 354. Like the incident analyzer 342, the file analyzer 344 may be configured to determine that a communication 304 in question does not potentially involve the use of steganography even when some of the communication criteria 354 are satisfied. Additional or alternative approaches may be selectively employed to determine when a communication 304 in question potentially involves the use of steganography.

The communication criteria 354 may relate to the communication 304 itself as well as a computer file 343 associated with the communication. As one example, the communication criteria 354 may include a criterion directed towards the file characteristics of the computer file 343 associated with the communication 304. File characteristics may include, e.g., file properties, file size, a checksum, and other types of file characteristics. File properties may include, e.g., a created-on property, a created-by property, a modified-on property, a modified-by property, and other types of file properties. If the computer file 343 is an image file, then the file characteristics may also include an image resolution. The checksum may be, e.g., an MD5 checksum generated by an MD5 hashing function. As noted above, the communication 304 may be an email communication 304a. Accordingly, the communication criteria 354 may also include a criterion directed towards whether the email communication 304a is an original email communication or a forwarded email communication. Additional or alternative communication criteria 354 may be selectively employed to determine that a communication 304 in question potentially involves the use of steganography. The use of communication criteria 354 to identify communications 304 that potentially involve the use of steganography will be discussed in further detail below.

If the steganalysis system 340 determines that a communication 304 in question does not potentially involve the use of steganography (block 414:N), then the steganalysis system may dismiss the incident associated with the communication (block 410) as described above. If, however, the steganalysis system 340 determines that a communication 304 in question does potentially involve the use of steganography (block 414:Y), then the steganalysis system may escalate the incident for further investigation (block 416). Escalating the incident may include, e.g., automatically sending a notification such as an email to an analyst or investigator identifying the incident and the associated communication 304 in question. Escalating the incident may additionally or alternatively include, e.g., automatically creating an issue ticket in an issue tracking system and assigning the new issue ticket to the analyst or investigator.

As also noted above, the steganalysis system 340 is configured to identify communications 304 where the potential use of steganography to hide content warrants further investigation. Accordingly, individual implementations of the steganalysis system 340 may differ with respect to the probability threshold that warrants further investigation of a communication 304. the probability threshold may be an absolute number of satisfied criteria, a percentage of satisfied criteria, or collective satisfaction of a particular subset of criteria. The probability threshold may depend, e.g., on the circumstances in which the steganalysis system 340 is implemented, a desired level of security, the needs of an organization implementing the system, and so forth. The example steganalysis system 340 provided is advantageously designed to be flexible in its implementation through the use of communication criteria 354 that indicate the potential use of steganography in a communication 304. As discussed in further detail below, the communication criteria 354 may be directed towards a computer file associated with the communication 304 (e.g., an email attachment or uploaded file) as well as the workstation at which the communication originated. The steganalysis system 340 may thus be selectively configured to meet the particular needs of an organization based on the type and amount of communication criteria 354 employed to identify potential steganography. For example, some implementations may identify potential steganography when a communication 304 in question satisfies relatively more communication criteria 354 while other implementations may identify potential steganography when a communication in question satisfies relatively less communication criteria 354. Furthermore, the operation of the steganalysis system 340 may be updated and customized as needed by adding new communication criteria or modifying existing communication criteria.

In some example implementations, the steganalysis system 340 may be configured to initiate processing of an incident and its corresponding communication 304 as soon as the network traffic monitoring system 318 generates the incident. In other example implementations, the steganalysis system 340 may be configured to periodically query the data store 322 of the network traffic monitoring system 318 for new incident records 324, e.g., on a daily basis. Moreover, the steganalysis system 340 may be configured to analyze incident records 324 and associated communications 304 during periods of reduced activity at the computer system 300, e.g., every night at midnight. In this way, the steganalysis system 340 may avoid interfering with the transmission of communications 304 during regular business hours.

Figure 5:
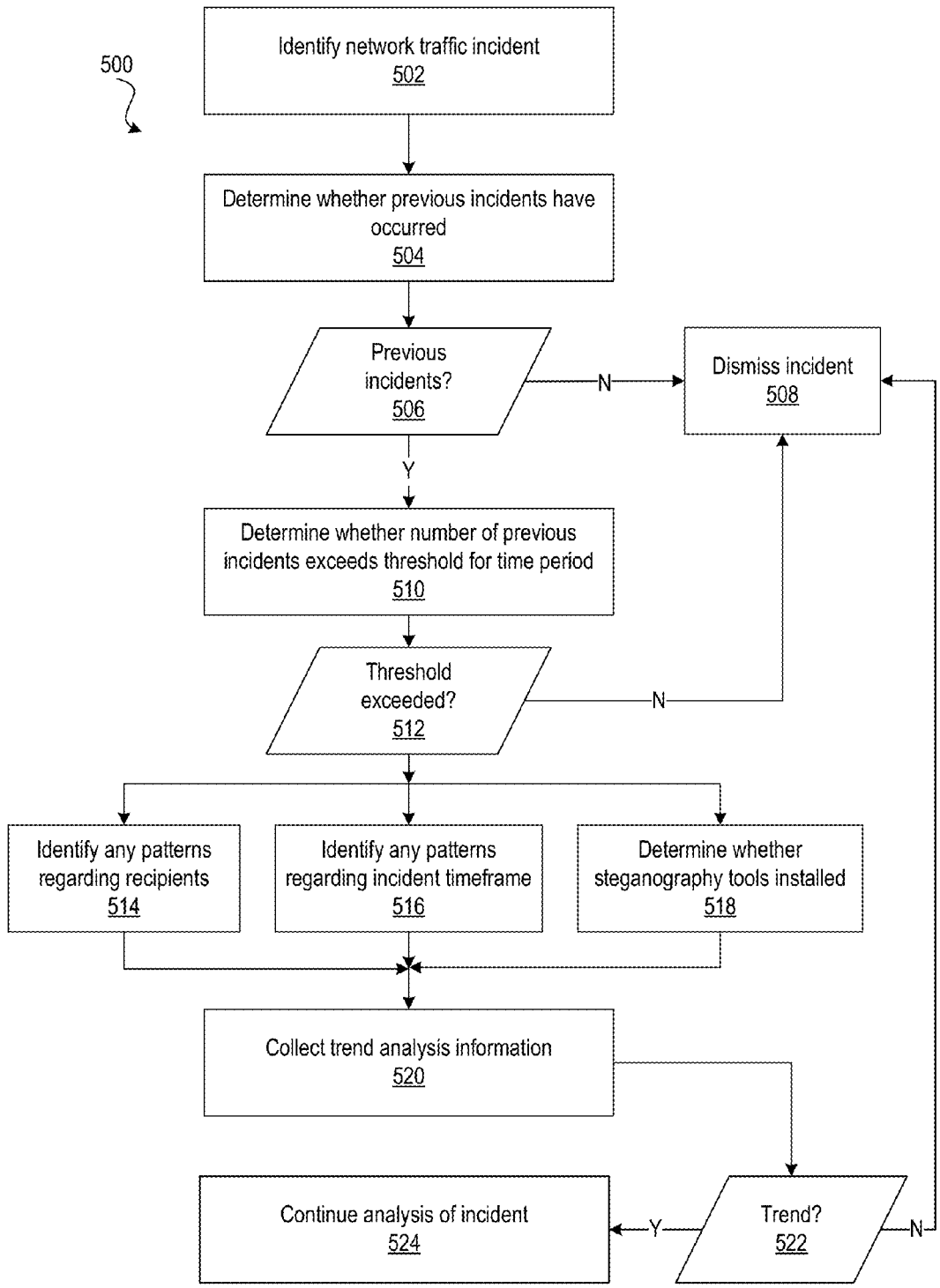
FIG. 5 is a flowchart of example method steps for determining whether a network traffic incident corresponds to a communication trend.

Turning now to FIG. 5, a flowchart 500 of example method steps for determining whether a network traffic incident corresponds to a communication trend is shown. The trending analysis process may be triggered when the network traffic monitoring system 318 generates a network traffic incident (block 502). The incident analyzer 342 of the steganalysis system 340 may access the incident records 324 stored at the network traffic monitoring system 318 to determine whether any previous incidents have occurred. Accordingly, the incident analyzer 342 may query the data store 322 for any incident records 324 associated with the sender of the communication that triggered the incident in question. If the incident analyzer 342 determines that there are no previous incidents (block 506:N), then the incident analyzer may determine that the incident in question is not associated with a communication trend and dismiss the incident (block 508).

If, however, the incident analyzer 342 determines that there are previous incidents (block 506:Y), then the incident analyzer may determine whether the total number of previous incidents exceeds a predetermined threshold within a predetermined time period (block 510), e.g., three incidents within the previous month. If the incident analyzer 342 determines that the previous incidents do not exceed the predetermined frequency threshold (block 512:N), then the incident analyzer may determine that the incident in question does not correspond to a communication trend and dismiss the incident (block 508). The predetermined frequency threshold may be selectively configured in various implementations. If, however, the incident analyzer 342 determines that the previous incidents do exceed the predetermined frequency threshold (block 512:Y), then the incident analyzer may continue its analysis of the incident in question.

For example, the incident analyzer 342 may perform one or more of the following steps to analyze the incident in question. The incident analyzer 342 may identify patterns regarding the respective recipients of the communications 304 associated with the incidents (block 514). As noted above, the incident analyzer 342 may determine whether a significant percentage of the communications 304 are sent to the same recipient. The incident analyzer 342 may also identify patterns regarding the timeframe in which the communications 304 are sent (block 516). As also noted above, the incident analyzer may determine whether a significant percentage of the communications 304 are sent at the same or a similar time, e.g., every Friday, the last Friday of every month, and other frequency patterns.

In some example implementations, the steganalysis system 340 may determine whether the workstation 306 at which a communication 304 originated includes steganography applications (block 518), e.g., steganography applications, steganography software, and other types of applications for hiding content in computer files using steganographic techniques. For example, that steganalysis system 340 may utilize the workstation analyzer 346 to access the workstation profile 328 stored at the workstation monitoring system 326. The workstation analyzer 346 may then compare the list of steganography applications 350 to the list of applications 330 installed or residing at the workstation 306. In this way, the workstation analyzer 346 may determine whether the workstation 306 that originated the communication 304 in question includes applications for hiding content through steganography. If the workstation analyzer 346 determines a steganography application is installed at the workstation 306, the workstation analyzer may, in some example implementations, analyze the user that installed the application. In particular, the workstation analyzer 346 may determine whether an administrator or the workstation user installed the steganography application. In some example implementations, the workstation analyzer 346 may determine that a steganography application installed by the workstation user (rather than an administrator) positively correlates with the potential use of steganography to hide content in the computer file.

Through these various steps, the steganalysis system 340 may collect trend analysis information (block 520). The trend analysis information may individually or collectively indicate whether the incident in questions corresponds to a communication trend. Accordingly, the steganalysis system 340 may perform one, some, or all of these example steps as well as additional or alternative steps to collect trend analysis information. If the steganalysis system 340 determines that the trend analysis information does not indicate a communication trend (block 522:N), then the steganalysis system may dismiss the incident in question (block 508). If, however, the steganalysis system 340 determines that the trend analysis information does indicate a communication trend (block 522:Y), then the steganalysis system may continue its analysis of the incident (block 524). The trend analysis information may include, e.g., one or more of numeric values, true or false values, and other types of information indicating whether the criterions of the trending criteria 352 are satisfied or not satisfied.

Figure 6:
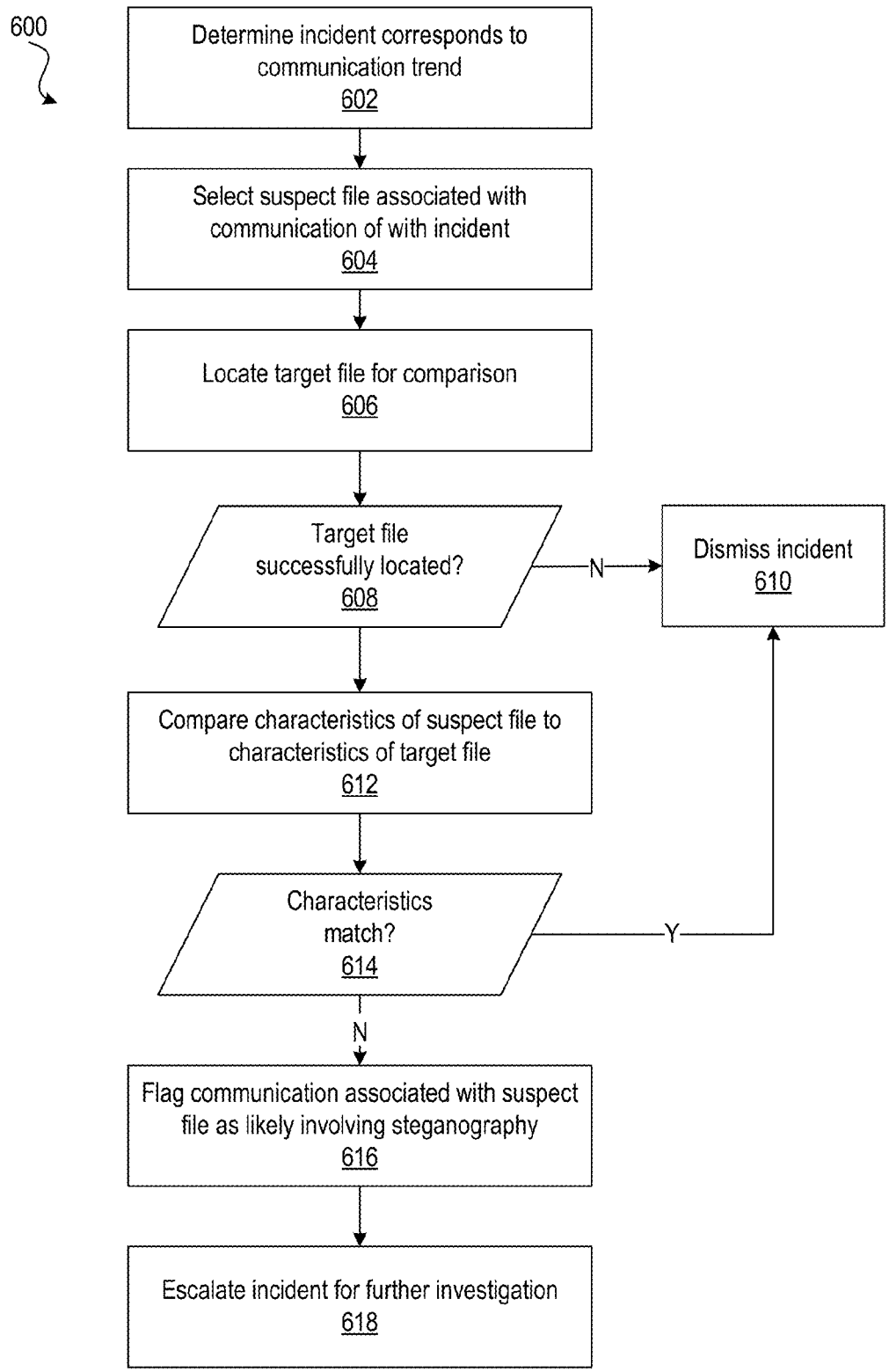
FIG. 6 is a flowchart of example method steps for determining whether a communication potentially involves the use of steganography through an analysis of a computer file associated with the communication.

In FIG. 6, a flowchart 600 of example method steps for determining whether a communication potentially involves the use of steganography through an analysis of a computer file 343 associated with the communication is shown. As noted above in FIG. 5, the steganalysis system 340 may continue analysis of a communication 304 when the steganalysis system determines the communication corresponds to a communication trend (block 602). As also noted above, the communication 304 may include content 341 hidden in a computer file 343 associated with the communication. For illustrative purposes, the computer file 343 may thus be referred to as the suspect computer file. In this respect, the steganalysis system 340 may select the suspect computer file 343 associated with the communication 304 of the incident for further analysis (block 604). In general, the steganalysis system 340 may detect the use of steganography through a comparison of the suspect file 343 to a target file 345 that is known not to include hidden content 341. If the file characteristics of the suspect file 343 match the file characteristics of the target file 345, then the steganalysis system 340 may determine that the suspect file 343 does not potentially include content hidden using steganography. If, however, the file characteristics of the suspect file 343 do not match the file characteristics of the target file 345, then the steganalysis system 340 may determine that the suspect file 343 potentially includes content hidden using steganography.

Referring back to FIG. 6, the steganalysis system 340 may locate a target file 345 for comparison to the suspect file 343 (block 606). The steganalysis system 340 may locate the target file 345 at the workstation 306 where the communication 304 originated or from an external source such as an image search service 356 accessible via, e.g., the Internet. In this regard, the target file 345 may be a downloaded file 338 residing at the workstation 306, or a similar image 358 located using the image search service 356. If the steganalysis system 340 cannot successfully locate a target file 345 for comparison (block 608:N), then the steganalysis system may dismiss the incident (block 610). If, however, the steganalysis system 340 does successfully locate a target file 345 for comparison to the suspect file 343 (block 608:Y), then the file analyzer 344 may analyze the suspect file 343 and the target file and compare their respective file characteristics (block 612). If the file analyzer 344 determines that the file characteristics match (block 614:Y), then the file analyzer may determine that the suspect file 343 does not include content 341 hidden using steganography and dismiss the incident (block 610).

If, however, the file analyzer 344 determines that the file characteristics of the suspect file 343 and the target file 345 do not match (block 614:N), then the file analyzer may determine that the suspect file potentially includes content 341 hidden using steganography and flag the communication 304 associated with the suspect file 343 (block 616). Having flagged the communication 343 as potentially involving the use of steganography, the steganalysis system 340 may escalate the incident associated with the communication for further investigation (block 618) as described above. Locating a target file 345 and comparing file characteristics will be discussed in further detail below with reference to FIG. 7 and FIG. 8 respectively.

It will be appreciated that the communication 304 and its associated file 343 need not satisfy every criterion in the set of communication criteria 354 for the file analyzer 344 to determine the suspect file potentially involves the use of steganography. The file analyzer 344 of the steganalysis system 340 may determine that a suspect file 343 potentially involves the use of steganography when only a portion of the communication criteria 354 are satisfied. Likewise, the file analyzer 344 may determine that a suspect file 343 does not potentially involve the use of steganography even when some of the communication criteria 354 are satisfied. The file analyzer 344 may be selectively configured to determine that a suspect communication does or does not potentially involve the use of steganography when relatively more or less of the communication criteria 354 are satisfied. In this way, operation of the steganalysis system 340 remains flexible according to the needs and preferences of individual circumstances.

Figure 7:
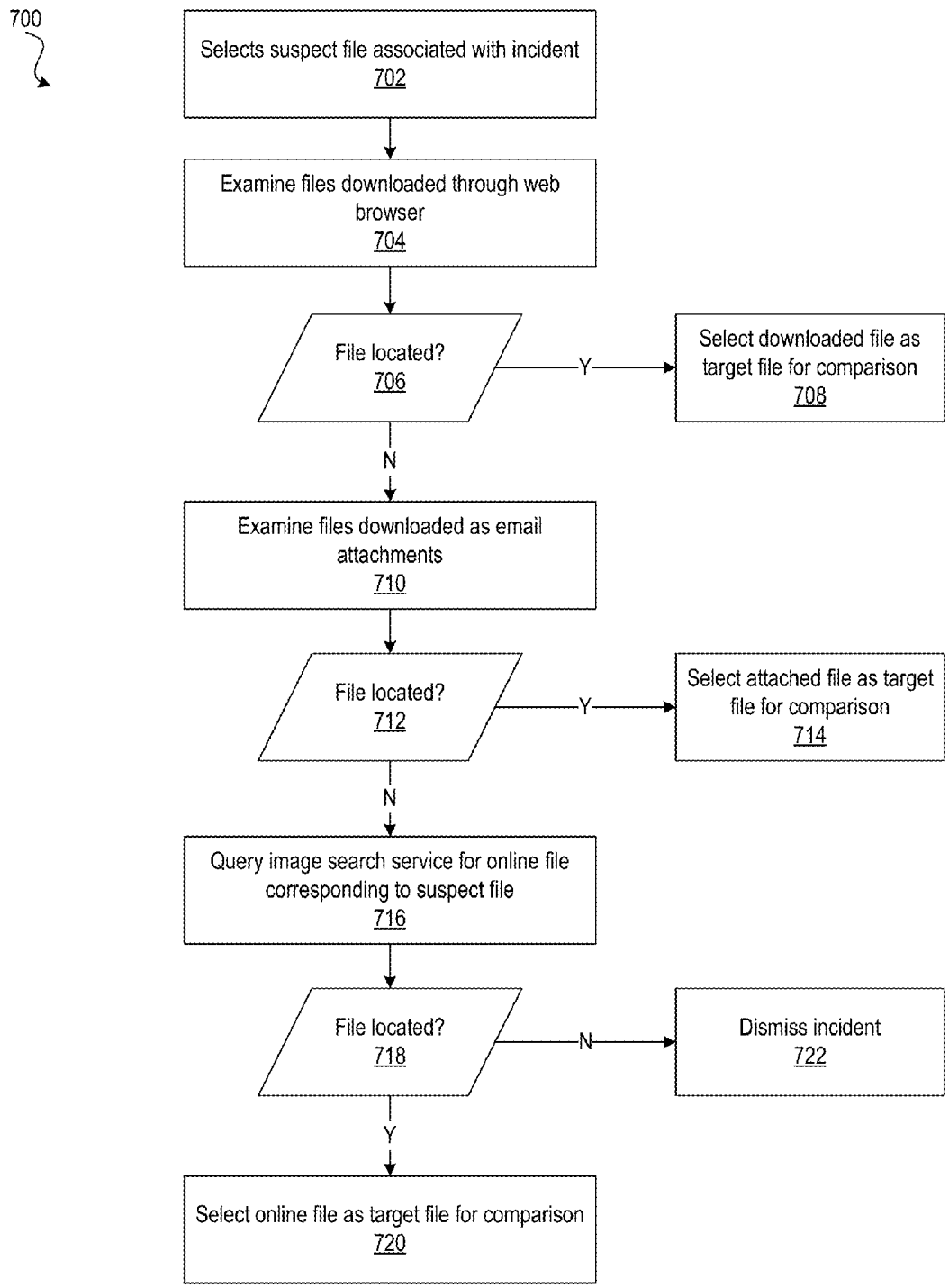
FIG. 7 is a flowchart of example method steps for locating a file for comparison with a file associated with a communication in order to detect potential use of steganography.

Referring now to FIG. 7, a flowchart 700 of example method steps for locating a target file 345 for comparison to a suspect file 343 is shown. Upon selection of a suspect file 343 for further analysis (block 702), the steganalysis system 340 may attempt to locate a target file 345 for comparison to the suspect file 343. The target file 345 may be a file that initially appears to match the suspect file. As noted above with reference to FIG. 6, the steganalysis system 340 may determine that the suspect file 343 potentially includes hidden content 341 when at least some of the file characteristics of the suspect file do not match the corresponding file characteristics of the target file 345. To locate a candidate target file 345, the steganalysis system 340 may look to locations both internal and external to the computer system 300. For example, the steganalysis system 340 may query the workstation 306 where the communication 304 associated with the suspect file 343 originated. The steganalysis system 340 may review the web browsing history of the workstation and examine any files 338 download through the web browser 334 of the workstation (block 704). If the steganalysis system 340 locates a downloaded file that appears to match the suspect file 343 (block 706:Y), then the steganalysis system may select the downloaded file as the target file 345 for comparison to the suspect file (block 708).

If the steganalysis system 340 does not locate a candidate target file 345 in the web history of the workstation 306 (block 706:N), the steganalysis system may examine the files 338 downloaded through the email client 332 as email attachments (block 710). If the steganalysis system 340 locates a candidate file that appears to match the suspect file 343 (block 712:Y), then the steganalysis system may select the downloaded email attachment 338 as the target file 345 for comparison to the suspect file (block 714). The steganalysis system 340 may locate and identify a candidate target file 345 based, e.g., on the filename, file properties, file size, and combinations of such. For example, if the filename of the suspect file 343 matches (or is similar to) the filename of a candidate target file, then the steganalysis system 340 may select the candidate target file having the matching or similar filename as the target file 345 to compare to the suspect file.

If the steganalysis system 340 cannot locate a candidate target file 345 at the workstation 306 where the communication 304 originated (block 712:N), then the steganalysis system may look to a source external to the computer system 300. The steganalysis system 340 may, for example, query an image search service 356 for an image that matches the suspect image 343 (block 716). As noted above, the image search service 356 may locate candidate images based on the filename of the suspect image 343, the content of the suspect image, and combinations of such. If the image search service 356 locates a candidate image 358 (block 718:Y), then the image search service may provide the candidate image to the steganalysis system 340, and the steganalysis system may select the candidate image 358 as the target image 345 for comparison to the suspect image 343 (block 720). If the image search service cannot locate a candidate image 758, then the steganalysis system 340 may dismiss the incident associated with the communication having the suspect image 343 (block 722).

It will be appreciated that the image search service 356 may locate multiple candidate images 358 based on the query from the steganalysis system 340. In this circumstance, selection of one of the candidate images 358 as the target image 345 may be done manually or automatically. As an example, the steganalysis system 340 may be configured to pause the steganalysis process and notify an analyst or investigator that multiple candidate images have been identified as candidate images. The steganalysis process may remain paused until the analyst or investigator manually selects one of the candidate images and may continue upon selection of one of the candidate images by the analyst or investigator. In this way, the analyst or investigator may advantageously review the suspect image 343 and the candidate images to determine which candidate image best matches the suspect image. The steganalysis system 340 may notify the analyst or investigator via email or through creation of a new issue ticket in an issue tracking system as described above. The steganalysis system 340 may also include a user interface that presents the suspect image 343 and candidate images along with input elements permitting selection of one of the candidate images as the target image 345. It will be also appreciated that the steganalysis system may be similarly configured to compare audio files, video files, document files, and other types of computer files.

In some example implementations, the network traffic monitoring system 318 may maintain a cache (not shown) of all image received at the computing system 300. When the system 300 receives an inbound communication 304, the communication may first pass through the network traffic monitoring system 318. Before the network traffic monitoring system 318 forwards a communication 304 to the intended workstation 306 of the recipient, the network traffic monitoring system may save a copy of any images associated with the communication in a global image cache. For example, the network traffic monitoring system 318 may save one copy of each image received at the system 300 as part of ordinary web communications 340b. The network traffic monitoring system 318 may likewise store copies of other types of computer files received at the computer system 300. The steganalysis system 340 may thus be configured, in some example implementations, to look to the image cache of the network traffic monitoring system 318 when attempting to locate a target file 345 for comparison to a suspect file 343.

Comparing a suspect image 343 to a target image 345 may provide insight into to the potential use of steganography to hide content in the suspect image. For example, if the suspect image 343 and the target image 345 have matching image resolutions, but the file size of the suspect image is larger than the file size of the target image, this may be an indication that the suspect image potentially includes content hidden through steganography. Another indication of the potential use of steganography to hide content in an image may be the circumstance in which the suspect image 343 has a file size larger than what would be expected based on its image resolution. Even if the suspect image 343 and the target image 345 have matching image resolutions and file sizes, a mismatched checksum may also indicate the potential use of steganography to hide content in the suspect image. It will be appreciated that minor differences between the suspect image 343 and the target image 345 may result in relatively small differences in respective file size. Accordingly, the steganalysis system 340 in some example implementations may employ a predetermined difference threshold such that the steganography system determines that a suspect image 343 potentially involves the use of steganography when a file size difference exceeds the difference threshold and determines that the suspect image does not potentially involve the use of steganography when the file size difference does not exceed the difference threshold. The difference threshold may be an absolute file size difference, e.g., 100 kilobytes (KB), or a percentage file size difference (e.g., 25%).

Figure 8:
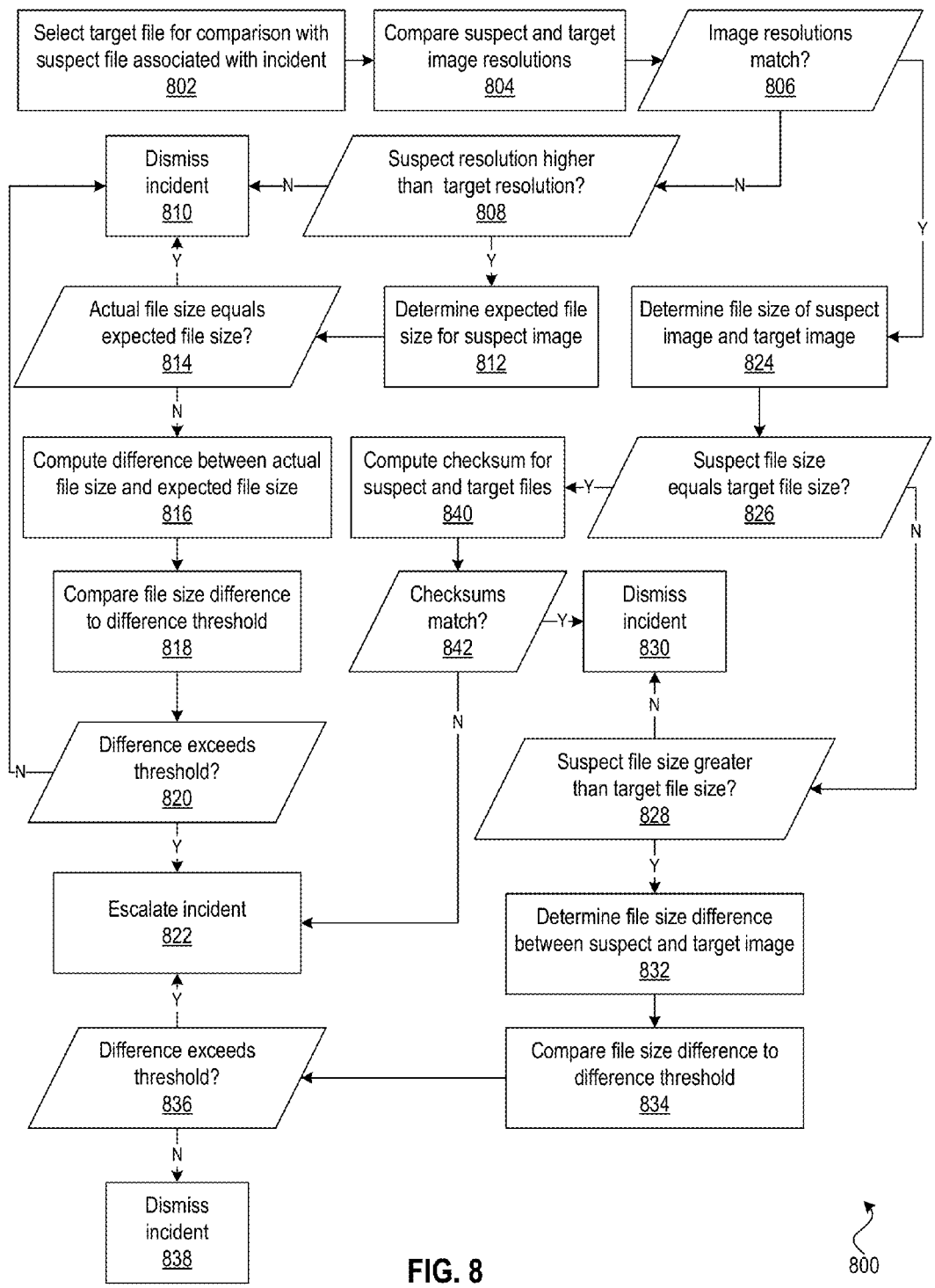
FIG. 8 is a flowchart of example method steps for comparing a file to a file associated with a communication to detect potential use of steganography.

In FIG. 8, a flowchart 800 of example method steps for comparing a suspect image 343 to a target image 345 in order to detect the potential use of steganography to hide content in the suspect image is shown. As noted above, the file comparison process is described by way of example in the context of image files. The principles set forth below, however, may be applied to other types of computer files, e.g., audio files, video files, and so forth. Having identified a target file 345 for comparison to a suspect file 343 (block 802), the file analyzer 344 of the steganalysis system 340, in this example, may determine and compare the respective image resolutions of the suspect image and the target image (block 804). Image resolution may refer to, e.g., the height and width of an image file in screen pixels or in printed dots per inch (dpi).

If the image resolution of the suspect image 343 does not match the image resolution of the target image 345 (block 806:N), then the file analyzer 344 may determine whether the image resolution of the suspect image is higher or lower than the image resolution of the target file (block 808). If the image resolution of the suspect image 343 is less than the image resolution of the target image 345 (block 808:N), then the steganalysis system 340 may determine that the suspect image 343 does not potentially include content hidden using steganography and dismiss the incident for the communication 304 having the suspect image (block 810). If, however, the image resolution of the suspect image 343 is higher than the image resolution of the target image (block 808:Y), then the file analyzer 344 may determine an expected file size of the suspect image based on its image resolution (block 812). As noted above, a suspect image 343 having a file size higher than what would be expected may be an indication of the use of steganography to hide content in the suspect image. It will be appreciated, however, that in some example implementations, the file analyzer 344 may determine an expected file size of the suspect image in response to a determination that the image resolution of the suspect image 343 is higher or lower that the image resolution of the target image.

Accordingly, if the actual file size of the suspect image 343 equals the expected file size of the suspect image (block 814:Y), the steganalysis system 340 may determine that the suspect image 343 does not potentially include content hidden through steganography and dismiss the incident for the communication 304 having the suspect image (block 810). If the actual file size of the suspect image 343 does not match the expected file size, however, the file analyzer 344 may compute the difference between the actual file size and the expected file size of the suspect image (block 816). As noted above, the steganalysis system 340 may employ a difference threshold and compare the file size difference between the actual and expected file size to the difference threshold (block 818). If the file size difference does not exceed the difference threshold (block 820:N), then the steganalysis system 340 may determine that the suspect image 343 does not potentially include content hidden through steganography and dismiss the incident for the communication 304 having the suspect image (block 810). If the file size difference does exceed the difference threshold (block 820:Y), however, then the steganalysis system 340 may determine that the suspect image 343 potentially includes content hidden through the use of steganography and escalate the incident for the communication 304 having the suspect image for further investigation (block 822).

If the image resolution of the suspect file 343 matches the image resolution of the target file 345 (block 806:Y), the suspect file may nonetheless potentially contain content hidden through the use of steganography. Accordingly, the file analyzer 344 may determine the file size of the suspect image 343 and the file size of the target image 345 (block 824). If the file size of the suspect image 343 does not match the file size of the target image 345 (block 826:N), then the file analyzer may determine whether the file size of the suspect image is greater than the file size of the target image (block 828). If the file size of the suspect image 343 is less than the file size of the target image 345 (block 828:N), then the steganalysis system 340 may determine that the suspect image does not potentially include content hidden through steganography and dismiss the incident for the communication 304 having the suspect image (block 830). If the file size of the suspect image 343 is greater than the file size of the target image 345 (block 828), however, then the file analyzer 344 may determine the difference between the respective file sizes of the suspect image and the target image (block 832).

As also noted above, minor differences in the suspect image 343 and the target image 345 may result in slight variations in file size. The file analyzer 344 of the steganalysis system 340, in some examples, may thus employ a difference threshold to account for such minor differences between the suspect image 343 and the target image 345. The file analyzer 344 may thus compare the file size difference to the difference threshold (block 834) and determine whether the file size difference exceeds the difference threshold (block 836). If the file size difference does not exceed the difference threshold (block 836:N), then the steganalysis system 340 may determine that the suspect image 343 does not potentially include content hidden through steganography and dismiss the incident for the communication 304 having the suspect image (block 838). If the file size difference does exceed the difference threshold (block 836), however, the steganalysis system 340 may determine that the suspect image 343 potentially includes content hidden through the use of steganography and escalate the incident for the communication 304 having the suspect image (block 822).

It will be appreciated that a suspect image 343 may potentially include content hidden through the use of steganography even when the image resolution for the suspect image matches the image resolution of the target image 345 (block 806:Y) and the file size of the suspect image matches the file size of the target image (block 826:Y). In this circumstance, the steganalysis system 340 may detect the potential use of steganography to hide content in the suspect image 343 based on the checksums of the suspect image and the target image 345. Accordingly, the file analyzer 344 may compute respective checksums (e.g., an MD5 checksum) for the suspect image 343 and the target image 345 (block 840). If the checksum for the suspect image 343 matches the checksum for the target image 345 (block 842:Y), then the steganalysis system 340 may determine that the suspect image does not likely include content hidden through steganography and dismiss the incident for the communication 304 having the suspect image (block 830). If, however, the checksum for the suspect image 343 does not match the checksum for the target image 345 (block 842:N), however, then the steganalysis system 340 may determine that the suspect image potentially includes content hidden through the use of steganography and escalate the incident for the communication 304 having the suspect image (block 822).

It will be appreciated that the example method steps may be configured and implemented for other types of computer files. Where the suspect file 343 and the target file 345 are audio files, for example, the file analyzer 344 may compare various audio file properties to determine whether a suspect audio file matches a target audio file. Comparable audio file properties may include, e.g., an identifier for the audio codec (encoder-decoder), the sample rate, the number of channels, the bit resolution, and other types of audio file characteristics. Where the suspect file 343 and the target file 345 are video files the file analyzer may compare various video file properties to determine whether a suspect video file matches a target video file. Comparable video file properties may include, e.g., an identifier for the video codec, the duration, frame size (screen pixel height and width), color depth, frame rate (frames per second), aspect ratio, and other types of video file characteristics. Comparable file properties for other types of files will thus be appreciated with the benefit of this disclosure.

Figure 9:
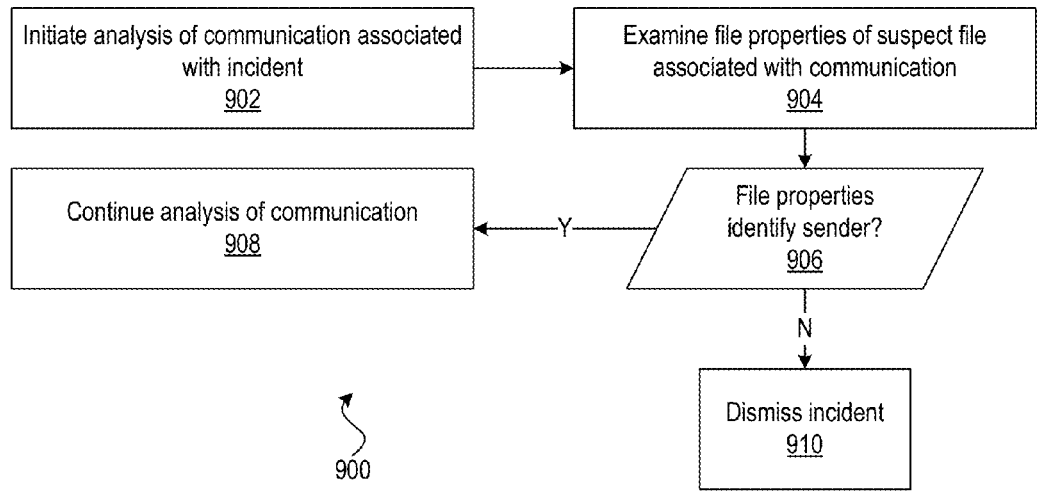
FIG. 9 is a flowchart of example method steps for analyzing the file properties of a file to detect the potential use of steganography.
Figure 10:
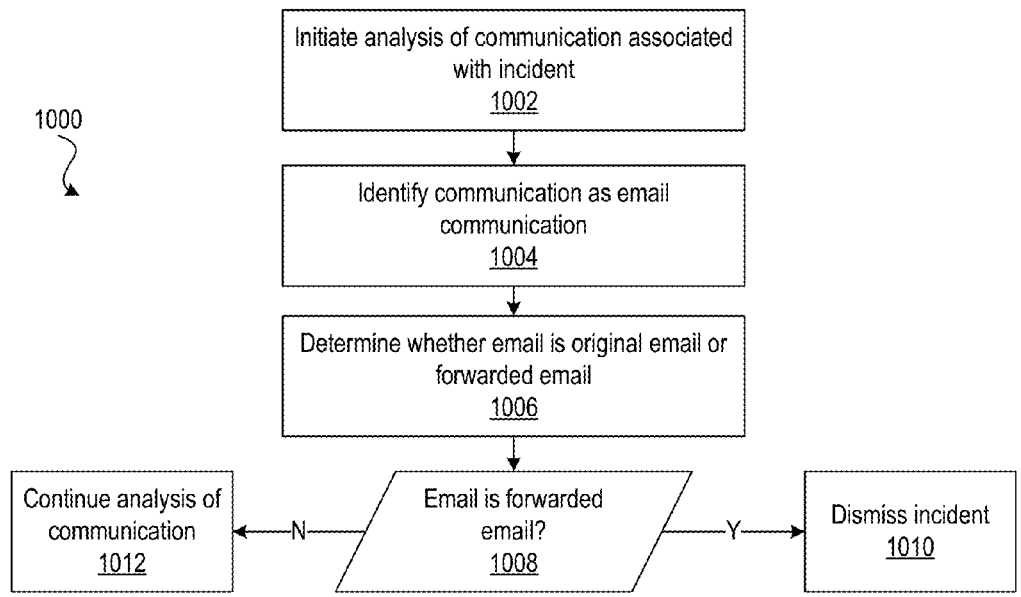
FIG. 10 is a flowchart of example method steps for analyzing an email communication to detect potential use of steganography.

In FIGS. 9 and 10, example method steps for implementing other types of criteria to determine whether a communication potentially involves the use of steganography are shown. These example method steps may be selectively performed as part of the communication analyses described by way of example above. In FIG. 9, a flowchart 900 of example method steps for analyzing the file properties of a suspect file 343 is shown. Having initiated an analysis of a communication associated with an identified incident (block 902), the steganalysis system 340 may analyze the file properties of a suspect file 343 (block 904). The steganalysis system, in this example, may assess whether the user that sent the communication 304 created or modified the suspect file. Accordingly, if the created-by or modified-by file properties identify the sender of the communication (block 906:Y), then the steganalysis system 340 may determine the suspect file 343 potentially includes content 341 hidden using steganography and continue the analysis of the communication (block 908). If, however, the created-by file property or modified-by file property do not identify the sender of the communication 304 (block 906:N), i.e., if the created-by or modified-by file properties identify another user other than the sender of the communication, then the steganalysis system may determine that the suspect file 343 does not potentially involve the use of steganography and dismiss the incident (block 910).

The steganalysis system may review other file properties such as the modification date file property to determine whether a suspect file 343 potentially involves the use of steganography. Where the steganalysis system 340 locates a matching target file 345 in the downloaded files 338 of the workstation 306, for example, the file analyzer 344 may compare the date the target file was download to the modification date of the suspect file 343. If the sender modified the suspect file 343 after the sender downloaded the target file 345, then the steganalysis system 340 may determine that the suspect file potentially involves the use of steganography. As another example, the steganalysis system reviews the owner file property and the modified-by file property to determine whether a suspect file 343 potentially involves the use of steganography. If these file properties indicate that the suspect file 343 was modified by a user other than the owner, then the steganalysis system 340 may determine that the suspect file potentially includes content hidden through the use of steganography. These example steps may be employed in combination with the steps of the example communication analyses described above.

In FIG. 10, a flowchart 1000 of example method steps for analyzing an email communication 304*a* are shown. Having initiated an analysis of a communication 304 associated with an identified incident (block 1002), the steganalysis system 340 may identify the communication as an email communication 304*a* (block 1004). The steganalysis system 340, in this example, may determine whether the email communication 304*a* is an original email communication created by then sender or a forwarded email communication that was originally created by another user (block 1006). If the email communication 304*a* is a forwarded email communication, a file 343 attached to the email is less likely to have been modified using steganography to hide content. Accordingly, if the email communication 304*a* is a forwarded email communication (block 1008:Y), the steganalysis system 340, in this example, may determine that a file 343 attached to the email does not potentially include content 341 hidden using steganography and dismiss the incident (block 1010). If, however, the steganalysis system 340 determines that the email communication 304*a* is not a forwarded email communication (block 1008:N), e.g., that the email communication 304*a* is an original email communication created by the sender, then the steganalysis system 340 may determine that the file 343 attached to the email potentially includes content 341 hidden using steganography and continue analysis of the communication (block 1012). These example steps may be employed in combination with the steps of the example communication analyses described above.

The steganalysis system and steganalysis methods described above provide various technical advantages. As noted above, steganography relies on computing technology to hide content in computer files transmitted in electronic communications. Steganalysis likewise relies on computing technology as a countermeasure to thwart attempts to hide content in computer files. The example steganalysis systems and methods described above automate at least some of the steps in detecting the potential use of steganography to hide content in computer files. Other technical advantages will be appreciated with the benefit of this disclosure.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, the steps illustrated in the illustrative figures may be performed in other than the recited order, and one or more steps illustrated may be optional in accordance with aspects of the disclosure.

What is claimed is:

1. A non-transitory computer-readable medium storing executable instructions that, when executed by a processor of a computing device, cause the computing device to:
   store, at a data store of a computing device, a set of steganographic criteria;
   determine, by the computing device, whether to analyze a first computer file for potential use of steganography based, at least in part, on an analysis of an electronic communication associated with the first computer file; and
   responsive to determining to analyze the first computer file for potential use of steganography:
      perform a comparison of the first computer file to a second computer file that at least appears to be a copy of the first computer file based on a file characteristic that the first and second computer files have in common,
      apply at least one steganographic criterion in the set of steganographic criteria to at least one result of the comparison, and
      determine whether the first computer file potentially includes hidden content based on whether one or more of the steganographic criteria are satisfied.

2. The non-transitory computer-readable medium of claim 1, wherein the instructions, when executed by the processor, further cause the computing device to:
   store, at the data store, a set of trending criteria;
   apply at least one trending criterion in the set of trending criteria to the electronic communication;
   determine whether the electronic communication is part of a communication trend based on whether one or more of the trending criteria are satisfied; and
   determine whether to analyze the first computer file for potential use of steganography further based on whether the electronic communication is part of a communication trend.

3. The non-transitory computer-readable medium of claim 1, wherein the instructions, when executed by the processor, further cause the computing device to:
   store, at the data store, a list of steganography applications;
   compare the list of steganography applications to a list of software applications residing at a computing device that sent the electronic communication; and
   determine whether to analyze the first computer file for potential use of steganography further based on whether one of the software applications listed matches one of the steganography applications listed.

4. The non-transitory computer-readable medium of claim 1, wherein the instructions, when executed by the processor, further cause the computing device to:
   locate the second computer file compared to the first computer file.

5. The non-transitory computer-readable medium of claim 4, wherein:
   locating the second computer file comprises identifying, at a computing device that sent the electronic communication, a computer file having a filename that matches a filename of the first computer file and selecting that computer file as the second computer file.

6. The non-transitory computer-readable medium of claim 5, wherein:
   the computer file was downloaded to the computing device via an email client or a web browser.

7. The non-transitory computer-readable medium of claim 4, wherein:
   locating the second computer file comprises querying a file search service and selecting a file search result as the second computer file.

8. The non-transitory computer-readable medium of claim 4, wherein:
   locating the second computer file comprises retrieving a cached file from a cache of computing files and selecting the cached file as the second computer file.

9. The non-transitory computer-readable medium of claim 1, wherein:
   the first computer file is a first image file and the second computer file is a second image file.

10. The non-transitory computer-readable medium of claim 9, wherein:
    the set of steganographic criteria comprises a steganographic criterion that is satisfied when a first checksum of the first image file does not match a second checksum of the second image file.

11. The non-transitory computer-readable medium of claim 9, wherein:
    the set of steganographic criteria comprises a steganographic criterion that is satisfied when (a) a first image resolution of the first image file matches a second image resolution of the second image file and (b) a first file size of the first image file is larger than a second file size of the second image file.

12. The non-transitory computer-readable medium of claim 9, wherein:
    the set of steganographic criteria comprises a steganographic criterion that is satisfied when (a) a first file size of the first image file is greater than a second file size of the second image file and (b) a difference between the first file size and the second file size exceeds a predetermined difference threshold.

13. The non-transitory computer-readable medium of claim 9, wherein:
    the set of steganographic criteria comprises a steganographic criterion that is satisfied when a file size of the first image file exceeds an expected file size that is based on a first image resolution of the first image file.

14. The non-transitory computer-readable medium of claim 1, wherein:
    the set of steganographic criteria comprises a steganographic criterion that is satisfied when one or more file properties of the first computer file indicate that a sender of the electronic communication created or modified the first computer file.

15. The non-transitory computer-readable medium of claim 1, wherein:

the set of steganographic criteria comprises a steganographic criterion that is satisfied when one or more file properties of the first computer file indicate that (a) a sender of the electronic communication modified the first computer file and (b) an owner of the first computer file is not the sender of the electronic communication.

16. The non-transitory computer-readable medium of claim 1, wherein:
the set of steganographic criteria comprises a steganographic criterion that is satisfied when one or more file properties of the first computer file indicate that the first computer file was modified after the second computer file was downloaded to a computing device that sent the electronic communication.

17. The non-transitory computer-readable medium of claim 1, wherein:
the electronic communication is an email communication; and
the set of steganographic criteria comprises a steganographic criterion that is satisfied when the email communication is an original email communication and is not satisfied when the email communication is a forwarded email communication.

18. The non-transitory computer-readable medium of claim 1, wherein the instructions, when executed by the processor, further cause the computing device to:
compare a file size of the first computer file to a predetermined file size threshold; and
determine whether to analyze the first computer file for potential use of steganography further based on whether the file size exceeds the predetermined file size threshold.

19. The non-transitory computer-readable medium of claim 1, wherein the instructions, when executed by the processor, further cause the computing device to:
provide a notification responsive to determining that a threshold number of steganographic criteria in the set of steganographic criteria are satisfied.

20. The non-transitory computer-readable medium of claim 1, wherein:
the electronic communication is a request to upload the first computer file to a web server.

* * * * *